United States Patent [19]

Richer et al.

[11] Patent Number: 4,956,709
[45] Date of Patent: Sep. 11, 1990

[54] FORWARD ERROR CORRECTION OF DATA TRANSMITTED VIA TELEVISION SIGNALS

[75] Inventors: Mark S. Richer, Alexandria, Va.; Aderemi A. Adeyeye, Adelphi, Md.; Hermann Helgert, Washington, D.C.

[73] Assignees: PBS Enterprises, Inc., Alexandria, Va.; EEG Enterprises, Inc., Farmingdale, N.Y.

[21] Appl. No.: 167,016

[22] Filed: Mar. 11, 1988

[51] Int. Cl.⁵ .............................................. H04N 5/08
[52] U.S. Cl. .................................... 358/147; 358/142
[58] Field of Search ............... 358/141, 142, 143, 146, 358/147; 380/18, 19, 20; 371/49, 50, 37, 2.1, 2.2

[56] References Cited

U.S. PATENT DOCUMENTS

| | | | |
|---|---|---|---|
| 4,380,027 | 4/1983 | Leventer et al. | 358/147 |
| 4,496,975 | 1/1985 | Noirel | 358/147 |
| 4,719,628 | 1/1988 | Otaki et al. | 371/50 |

FOREIGN PATENT DOCUMENTS

| | | | |
|---|---|---|---|
| 2704822 | 8/1978 | Fed. Rep. of Germany | 380/37 |
| 0062287 | 4/1985 | Japan | 358/142 |

OTHER PUBLICATIONS

Franco, Albert G., "Coding for Error-Free Communications", Science, #109, 1/68, 571-37.
Veith, Richard H., "Televisions Teletext", Elsevier Science Publishing Co. Inc., 1985, pp. 141-151.

Primary Examiner—James J. Groody
Assistant Examiner—David E. Harvey
Attorney, Agent, or Firm—Burns, Doane, Swecker & Mathis

[57] ABSTRACT

An encoding technique for data that enables the data to be reliably transmitted via television signals, even when impulse noise may be present, uses a two-fold approach for forward error correction. As a first step, the data is assembled into blocks of suitable length and each block is encoded with an error correcting code to enable individual bit errors to be identified and corrected at the receiving end. In addition, the blocks of data are interleaved over several different lines of information. Each line of information is transmitted during the vertical blanking interval in a respective field of a video signal. At the receiving end, the individual lines of data are reassembled into the blocks of information. If impulse noise or other disruptions cause one of the lines to be lost, the result at the receiving end would only be the loss of one bit of data in each block. The error correcting code with which each block is encoded enables this individual bit error to be identified and corrected.

27 Claims, 4 Drawing Sheets

FORWARD ERROR CORRECTION OF DATA TRANSMITTED VIA TELEVISION SIGNALS

BACKGROUND OF THE INVENTION

The present invention is directed to the encoding of data for transmission and subsequent decoding thereof, and is particularly concerned with the encoding of data to place it in a form suitable for transmission via standard television program signals.

In the transmission of digital data, for example from one computer to another, it is common to employ existing communication media where the data is to be transmitted over large distances, and thereby avoid the need for dedicated data transmission lines. For example, the use of telephone lines to communicate data between computers, via modems, is one popular form of data transmission. However, since telephone lines were originally designed for voice grade communications, they offer limited bandwidth capabilities for data communication. As a result, the speed at which data can be transmitted over telephone lines, i.e. the available baud rate, is limited.

In an effort to increase the speed at which data can be efficiently transmitted, other existing forms of transmission media are being evaluated. One such medium is the television communication network. The transmission bandwidth that is available in a standard television channel can readily accommodate the transmission of data at higher rates. Furthermore, the availability of television reception at almost any point within the United States makes television transmission a viable medium for communicating data from any location to another location at a relatively low cost.

Typically, data is transmitted within a television signal by inserting the data in one or more lines of the vertical blanking interval of a standard television field. Since the vertical blanking interval does not contain any video information, i.e., any information pertaining to the image to be reproduced on a television screen, the placement of data on these lines of the signal would not interfere with the normal television program.

The transmission of data via television signals is not without its attendant limitations, however. Foremost among these are the types of noise that can be encountered when the television signal is transmitted through a commonly employed transmission medium, e.g., over the air or through cable. More particularly, in any form of transmission the data is normally subject to random noise that can create errors in individual bits of the data. By encoding the transmitted data with a suitable error checking code, individual bit errors can be readily identified in the received data and corrected. However, in addition to random noise that can cause errors with respect to individual bits, television transmissions are also subject to impulse noise that can delete an entire horizontal line of information. In such a case, error checking codes alone are not effective, since insufficient information is available at the receiving end to detect whether errors are present. Accordingly, it is desirable to provide an encoding technique for data that enables the data to be reliably transmitted via television signals and reconstructed at the receiving end, even when random noise and impulse noise may be present.

BRIEF STATEMENT OF THE INVENTION

In accordance with the present invention, the foregoing objective is achieved by using a two-fold approach to the encoding of data for forward error correction. As a first step, the data is assembled into blocks of suitable length and each block is encoded with an error correcting code to enable individual bit errors to be identified and corrected at the receiving end. In addition, the blocks of data are interleaved over several different lines of information. For example, one line of information may comprise the first bit of data in each of a number of blocks, the second line comprises the second bit of data from each block, etc. Each line is separately transmitted in a respective horizontal line of the vertical blanking interval in a video signal. At the receiving end, the individual lines of data are reassembled into the blocks of information. If impulse noise causes one of the lines to be lost, the result at the receiving end would only cause a single bit error in each block. The error correcting code with which each block is encoded would enable this individual bit error to be identified and corrected.

Thus, the combination of encoding the blocks of information with an error correcting code and interleaving them among several different horizontal lines of the video signal substantially diminishes the likelihood of bit errors due to impulse noise as well as random noise. If desired, the transmission of the data can be made secure by rearranging the order in which the lines of data are transmitted in accordance with a pseudo-random code, for example.

Further features of the present invention and the advantages offered thereby are explained in detail with reference to preferred implementations described with the aid of the accompanying drawings.

DESCRIPTION OF THE ILLUSTRATED EMBODIMENTS

In the following detailed description of preferred embodiments of the invention, specific reference is made to the transmission of data within the vertical blanking interval of a television signal. To further facilitate an understanding of the invention, it is described with specific reference to an example in which the data is assembled and transmitted in blocks containing 21 bits of information each. It will be appreciated, however, that the specific applications of the invention are not so limited. Rather, the encoding technique of the present invention is applicable to any form of data transmission in which it is desirable to provide immunity to impulse noise as well as random noise.

Figure 1:
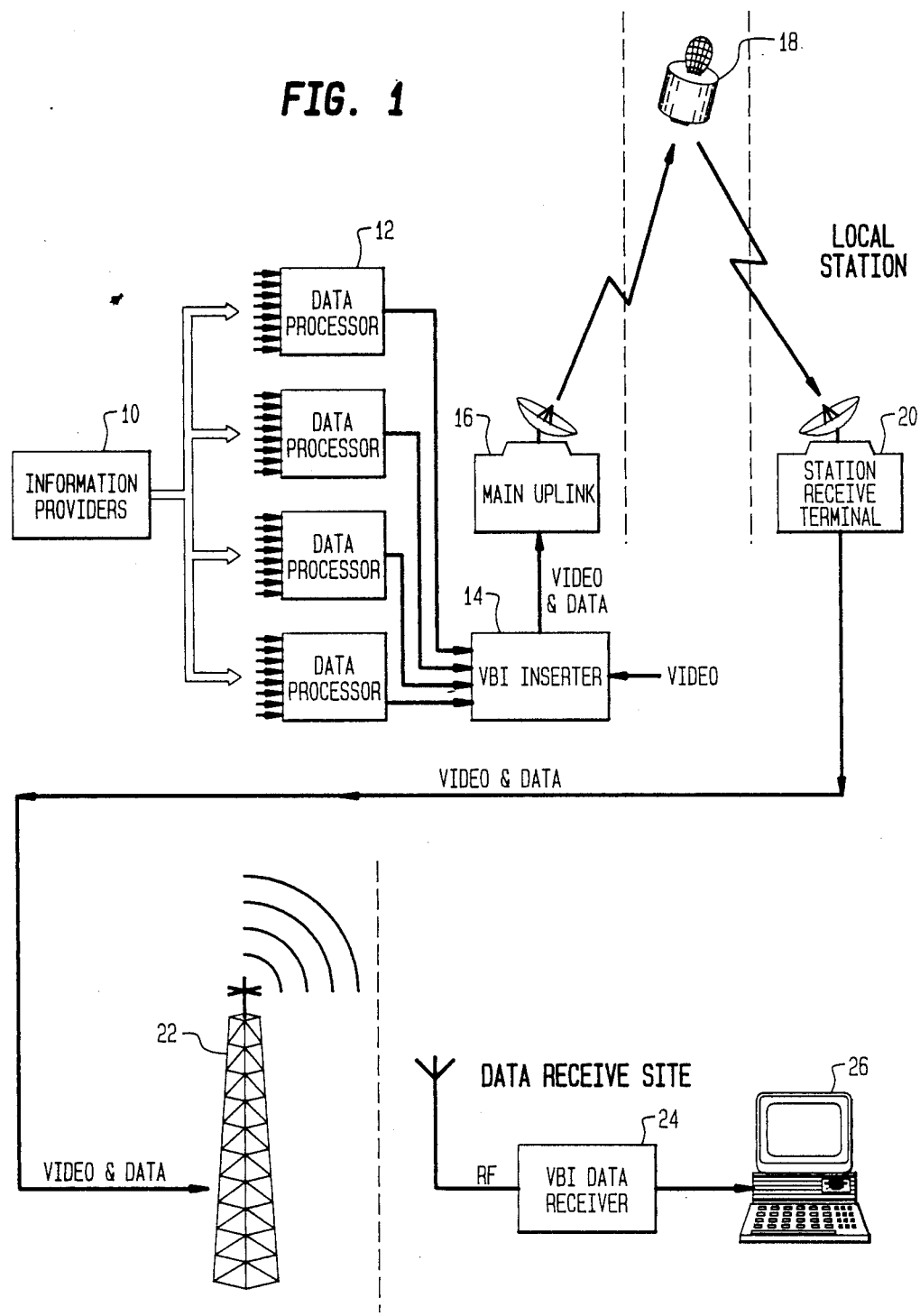
FIG. 1 is a general schematic view of a system for delivering data by means of television signals.

Referring to FIG. 1, an example of a television data transmission system in which the present invention might be employed is illustrated in schematic form. Data to be transmitted to an end user is supplied by one or more information providers 10, e.g., computers, and presented to a data processor 12. In the embodiment illustrated in FIG. 1, four data processors each capable of receiving data from eight information providers are illustrated, to thereby offer the ability to multiplex data from 32 different information sources. Within each data processor 12, the data is encoded with an error checking code and assembled into lines of information to provide forward error correction in accordance with the present invention. The encoded data is presented to a VBI inserter 14, where it is inserted into lines in the vertical blanking interval of a video signal. For example, each successive line of information from the data processors can be inserted on the same number horizontal line of successive video frames in the video signal. The combined video and data signal is provided to a main uplink where it is broadcast, for example, by means of a communications satellite 18.

The broadcast signal is received at a local television station 20, where it may be modified, time shifted, or the like, and then rebroadcast by means of a local transmitter 22. This signal is received by a VBI data receiver 24, where the data is stripped from the video signal, decoded and applied to an end utilization device, such as a personal computer 26.

Figure 2:
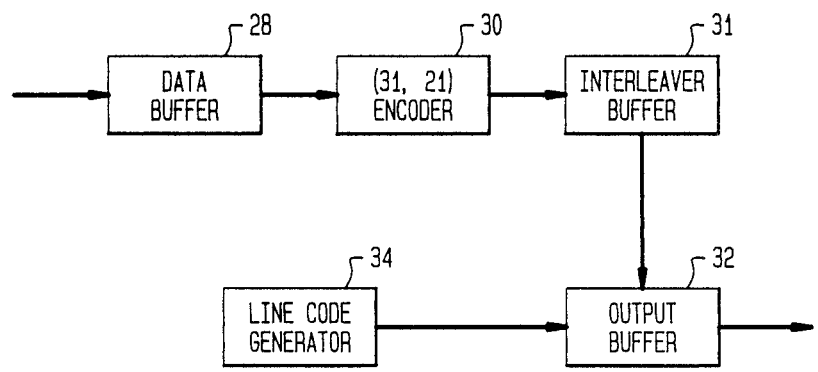
FIG. 2 is a schematic block diagram of a data processor for encoding data in accordance with the present invention.

Referring to FIG. 2, a data processor 12 is illustrated in block diagram form. Data from the information providers 10 is first presented to a data buffer 28 which stores the data for presentation to an encoder 30. The data is presented to the encoder in blocks of 21 bits each. The encoder 30 encodes each block of 21 data bits with a BCH error correction code, and generates an encoded block of 31 bits. In a preferred embodiment of the invention, each encoded block comprises the 21 information bits and 10 parity bits.

Each encoded block from the encoder 30 is stored in an interleaver buffer 31. The interleaver buffer can comprise a suitable random access memory, for example. After the buffer 31 is filled with a suitable number of encoded blocks of data from the encoder 30, the stored information is read out of the buffer and supplied to an output buffer 32. In addition to the encoded blocks of data, the buffer 32 is provided with additional information to be transmitted in the video signal. One such form of information is line codes produced by a line code generator 34. In addition, other suitable information, such as bit and byte synchronization data, data channel addresses, etc., can be provided to the buffer. Once this additional information has been entered into the output buffer 32 along with the encoded data, the resulting lines of data are read out for presentation to the VBI inserter 14.

Figure 3:
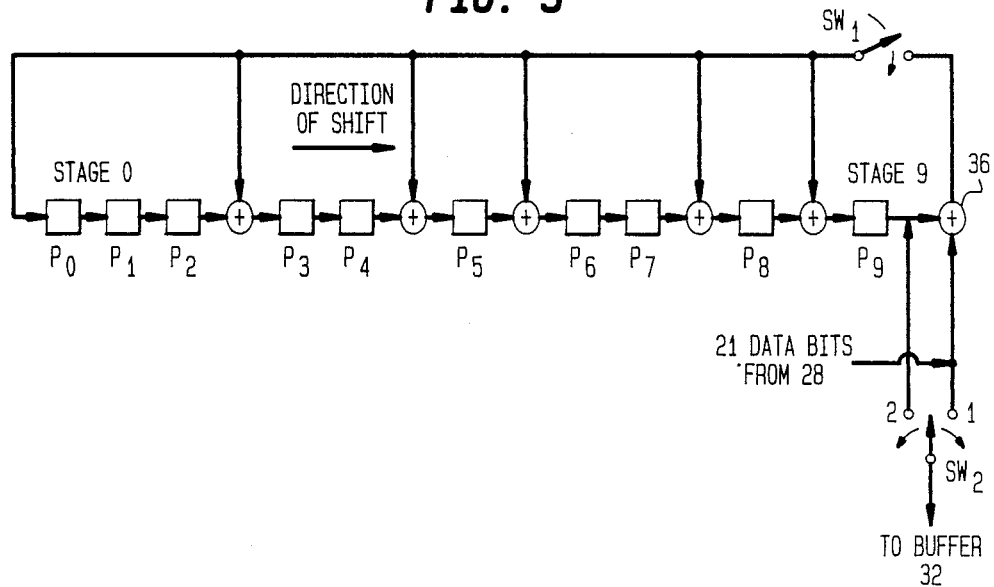
FIG. 3 is a block diagram of an encoder for generating an error checking code.

The encoder 30 for producing a (31,21) BCH code is illustrated in greater detail in FIG. 3. In the particular embodiment illustrated in this figure, the code is a cyclic BCH code having a minimum distance of 5, which is the largest obtainable value for a (31,21) code. This type of code can correct all 31 single bit errors and all 465 double bit error patterns that could occur in a 31 bit block of information. In addition, the code is capable of correcting 527 of the 4495 possible triple bit error patterns that could occur in such a block. Referring to FIG. 3, the encoding of the data is implemented by means of a feedback shift register. The register consists of 10 stages of delay, respectively labeled $P_0$–$P_9$. Each stage shifts its contents serially to the next stage in response to suitable control or clocking pulses. The 21 data bits from the data buffer 28 are successively applied to an exclusive-OR gate 36, also known as a modulo-2 adder. Upon each clocking pulse, each successive data bit is modulo-2 added to the bit stored in the rightmost register stage $P_9$. This sum is applied as an input to the first stage $P_0$, and modulo-2 added to the contents of each of the stages $P_2$, $P_4$, $P_5$, $P_7$ and $P_8$.

The generation of a code word consisting of 21 information bits and 10 parity check bits begins with the clearing of the register by entering a logic 0 into each of the stages $P_0$–$P_9$. A switch $SW_1$ is closed to connect the input of the first stage $P_0$ to the output of the modulo-2 adder 36.

In addition, a switch $SW_2$ is set to Position 1 to directly connect the data input line to the interleaver buffer 32. The 21 data bits from the data buffer 28 are then successively shifted into the encoder and simultaneously presented to the buffer 32. After the 21st data bit, the switch $SW_1$ is opened and the switch $SW_2$ is set to Position 2 to connect the last stage $P_9$ of the encoder to the buffer 32. The 10 parity check bits stored in the respective stages of the encoder are then shifted to the buffer 32. As a result, a 31-bit BCH codeword is stored in the buffer. This encoding operation is repeatedly carried out for each successive block of 21 data bits.

Figures 4, 5:
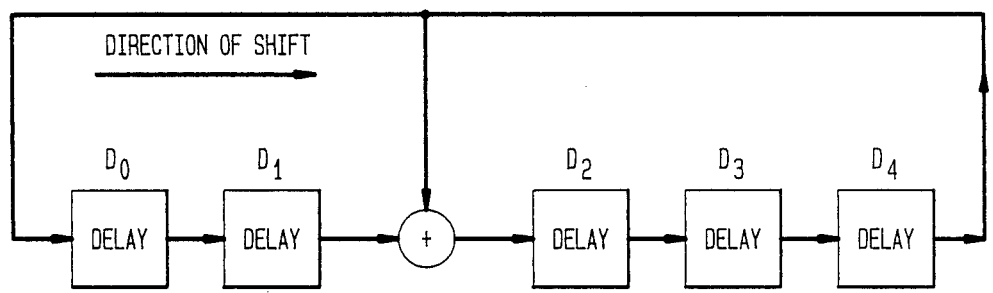
FIG. 4 is a diagram of the manner in which the encoded data is arrayed in the interleaver buffer.
FIG. 5 is a schematic block diagram of a pseudo-random number generator.

Referring now to FIG. 4, the manner in which the encoded data is stored and interleaved in the buffer 32 is illustrated in greater detail. In the specific example illustrated in FIG. 4, 248 bits of information from the codewords are transmitted in a horizontal line of a video signal, along with other suitable control and synchronization information. In operation, the 31-bit BCH codewords from the encoder 30 are successively loaded into respective columns of a 31 row array within the interleaver buffer 32. In the example of FIG. 4, the first codeword is loaded into Column C13, and the next 247 codewords are respectively loaded into Columns C14–C260. The first 12 columns of the array are loaded with 12-digit line codes provided by the line code generator 34. The line codes are unique for each row in the array. In a preferred embodiment of the invention, any two line codes differ from each other by at least 5 of the 12 bits. Furthermore, the code that is formed by the line code words is nonlinear in that the exclusive-OR sum of the respective pairs of bits in any two code words does not necessarily result in another code word. One example of a line code bit pattern which meets these criteria is shown in the following Table 1:

TABLE 1

| Line No. | Line Code |
| --- | --- |
| 1 | 0 0 0 0 0 0 0 0 0 0 0 0 |
| 2 | 0 0 0 1 1 1 1 1 1 1 1 1 |
| 3 | 1 1 1 0 0 0 1 1 1 1 1 1 |
| 4 | 1 1 1 1 1 1 0 0 0 1 1 1 |
| 5 | 1 1 1 1 1 1 1 1 1 0 0 0 |
| 6 | 0 1 1 0 1 1 0 1 1 0 1 1 |
| 7 | 1 0 1 1 0 1 1 0 1 1 0 1 |
| 8 | 1 1 0 1 1 0 1 1 0 1 1 0 |
| 9 | 0 1 1 1 0 0 1 0 0 1 0 0 |
| 10 | 1 0 1 0 1 0 0 1 0 0 1 0 |
| 11 | 1 1 0 0 0 1 0 0 1 0 0 1 |
| 12 | 1 0 0 0 1 1 1 1 0 0 1 0 0 |
| 13 | 0 1 0 1 0 1 0 1 0 0 1 0 |
| 14 | 0 0 1 1 1 0 0 0 1 0 0 1 |
| 15 | 1 0 0 1 0 0 0 1 1 1 0 0 |
| 16 | 0 1 0 0 1 0 1 0 1 0 1 0 |
| 17 | 0 0 1 0 0 1 1 1 0 0 0 1 |
| 18 | 1 0 0 1 0 0 1 0 0 0 1 1 |
| 19 | 0 1 0 0 1 0 0 1 0 1 0 1 |

TABLE 1-continued

| Line No. | Line Code |
|---|---|
| 20 | 001001001110 |
| 21 | 111010100001 |
| 22 | 111001010100 |
| 23 | 111100001010 |
| 24 | 001111010100 |
| 25 | 100111001010 |
| 26 | 010111100001 |
| 27 | 100001111010 |
| 28 | 010100111001 |
| 29 | 001010111100 |
| 30 | 010100001111 |
| 31 | 001010100111 |

In addition to the BCH codewords and line codes shown in FIG. 4, other control data can be stored in the array. For example, each row of the buffer could contain a suitable number of bits for bit and byte synchronization, as well as addressing information to distinguish data encoded on one VI line from data encoded on another line, or the like. In such a case, the buffer would contain more than the 260 columns represented in FIG. 4.

Once the appropriate amount of data has been inserted into the array, it is retrieved from the buffer on a row-by-row basis. Each row of bits retrieved from the buffer is inserted into a successive line of the vertical blanking interval by the VBI inserter 14 (FIG. 1). For example, each successive row of information from the buffer 32 can be inserted on the same number line, e.g., line 17, of the vertical blanking interval in successive fields of the video signal. Alternatively, the successive lines of information from the buffer could be inserted on plural horizontal lines of the same video field, or the line number could be changed from one field or frame to the next, to provide a level of security.

To provide a different kind of security to prevent unauthorized access to the data, the lines of information from the buffer 32 can be transmitted in a pseudo-random order. Referring to FIG. 5, a 5-stage linear feedback shift register for generating a pseudo-random ordering of the rows of information is illustrated. This random number generator comprises five stages $D_0$–$D_4$ connected in series to shift their contents from one stage to the next. The contents of the last stage $D_4$ is fed back to the first stage $D_0$. In addition, it is modulo-2 added to the contents of the second stage $D_1$ to determine the logic bit that is to be inserted in the third stage $D_2$.

In operation, the five stages of the number generator are loaded with an initial bit pattern. These bits are then successively shifted to the right 30 times. During this shifting, the stages of the register will contain the binary coded decimal equivalent of the integers from 1 to 31. The specific order of appearance of these integers will be determined by the initial content of the stages. After the 30th shift, one additional shift of the register will cause its contents to return to the initial bit pattern, and the process can be repeated. The 31 rows of information stored in the output buffer 32 can be retrieved in the order determined by the pseudo-random number generator and successively transmitted in that order, to thereby scramble the information and prevent unauthorized access thereto.

After transmission via the television signal, the information is received at a VBI data receiver 24 at the data receiving site. Within this receiver, the data is stripped from the video signal, for example, by gating the particular horizontal line of the vertical blanking interval on which the data is located to a suitable processor. Within the processor, bit and byte synchronization are established and data channel address information is verified. The data on the successive VBI lines is then entered into an array buffer consisting of 260 columns and 31 rows of binary storage elements, similar to the format shown in FIG. 4. The first 12 bits of each row in the buffer permanently contain the codes in the order in which the lines were transmitted. For example, these line codes might be ordered in the sequence determined by the random number generator illustrated in FIG. 5. The remaining storage elements in the array are initially set to a predetermined logical state, e.g., 0.

As the data is received, it is loaded into the array buffer and examined to determine whether an appropriate set of 31 consecutive VBI line data fields is contained therein. More particularly, various types of problems that could arise in the transmission and reception of the data must be detected and corrected. For example, the buffer could contain consecutive lines 2–31 of one array, followed by line 1 of the next array, rather than 31 consecutive lines from the same array. In another example, a line of the array may be absent, so the buffer contains lines 1–20 and 22–30 of one array, followed by line 1 of the next array. Further, as a result of the initialization process, a set of data lines in the buffer at any particular time can include one or more lines of logical zeros. Finally, the bit errors that are produced during the VBI line transmission could alter one or more of the line codes, resulting in either an erroneous but legitimate line code or a bit pattern that does not correspond to any legitimate line code.

Figure 6:
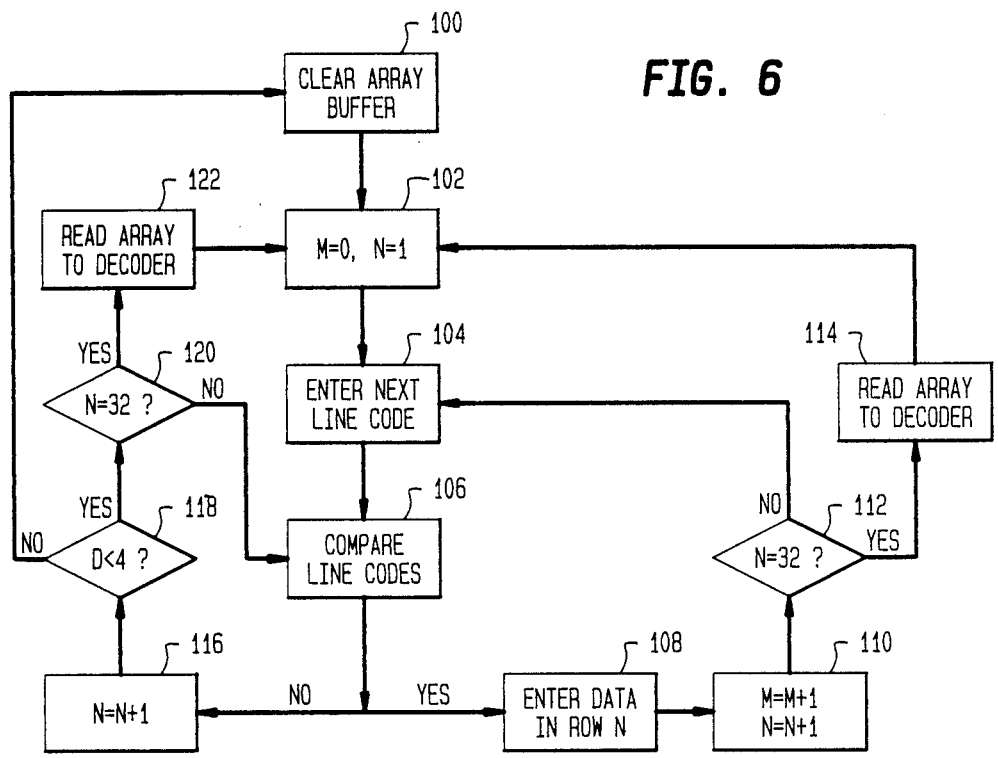
FIG. 6 is a flow chart of the array synchronization algorithm.

Accordingly, once the received information is initially loaded into the array buffer, it must be examined to determine whether any of these problems may have arisen. One example of an algorithm for examining the received data and correcting for the foregoing error conditions is illustrated in FIG. 6. Referring thereto, as a first step 100 in the algorithm, the array buffer is cleared, for example, by loading all of the data positions with a logical 0. At step 102, two counters M and N are initially set to 0 and 1, respectively. In step 104, the data in the next received VBI line is stored in Row N of the buffer. As a next step 106, the permanent line code stored in Row N of the buffer is compared with the line code of the received VBI line. If the two line codes match, the data is left in Row N (Step 108). In a preferred embodiment of the invention, a matching of the line codes need not require an exact match of all 12 bits. Rather, because of the distance properties of the line code, if 10 or more of the bits of the two line codes are the same, the codes are considered to match.

If a match has occurred and the data is entered in Row N of the array, both M and N are incremented by 1 (Step 110) and N is examined to determine whether it equals 32, to thereby indicate the end of the array (Step 112). If the array has not yet been completed, the procedure returns to Step 104 to examine the next received VBI line. If, on the other hand, the array is t completed, i.e., N=32, columns C13–C260 of the array are read to a BCH decoder buffer by shifting out the rows in the order in which they exist in the interleaver buffer at the transmitter, as shown in FIG. 4. The procedure then returns to Step 102, in which the counters are initialized and the next array is examined.

If there is no match upon comparison of the received and stored line codes in Step 106, the value N is increased by one at Step 116 and the data is shifted from Row N to Row N+1 of the array buffer. In Step 118, a value $D=N-M$ is calculated and examined to determine whether it is less than 4. If $D=4$, meaning that 4 successive examinations of the line code have not resulted in a match, the procedure returns to Step 100 and the buffer is cleared. If, however, less than 4 examinations have been made, N is again examined at Step 120 to determine whether it is equal to 32. If so, the array is forwarded to the BCH decoder buffer at Step 122. If, however, N has not yet reached a value of 32, the procedure advances to Step 106, where the line code for the received VBI line is compared with the stored line code for the new value of N.

Figure 7:
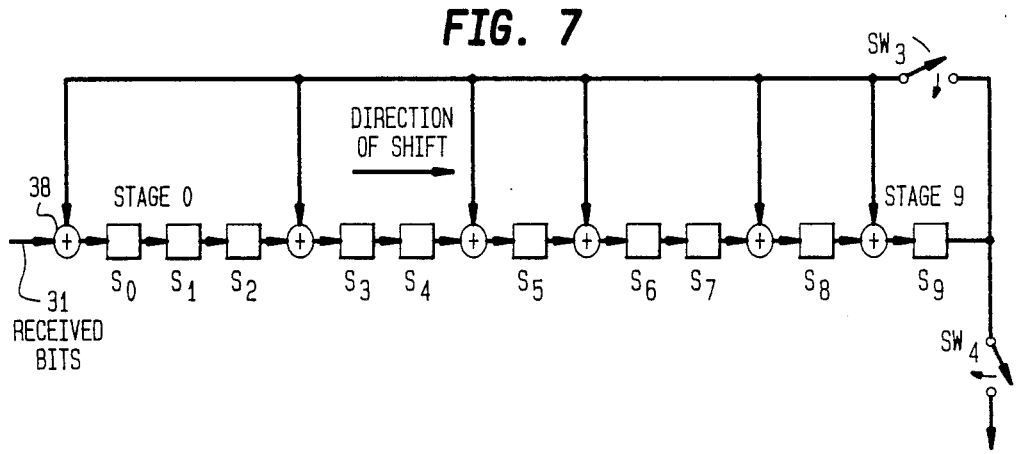
FIG. 7 is a block diagram of the syndrome computer for detecting bit errors in the received data.

In the decoding of the received data to identify and correct transmission errors, the 31 received bits in one of the columns of the decoder buffer are first processed to generate a syndrome which contains all pertinent information regarding the location of errors. Referring to FIG. 7, an example of a syndrome computer is illustrated. This computer comprises a 10-stage shift register similar to that employed for encoding, as shown in FIG. 3. In the operation of this syndrome computer, the register is first cleared by entering a logic 0 into each of the delay stages $S_0$–$S_9$. A switch $SW_3$ is closed to connect the output of the last stage $S_9$ with one input of a modulo-2 adder that receives the data bits at its other input. The output of this adder is entered into the first stage $S_0$ of the register. The bit in the last stage $S_9$ is also modulo-2 added to the bit in each of the stages $S_2$, $S_4$, $S_5$, $S_7$ and $S_8$ for presentation to the respective succeeding stages. At this time, a second switch $SW_4$ connected to the output of the last stage $S_9$ is open.

The 31 received bits are successively shifted into the register in the order in which they exist in the column of the decoder buffer. After the last bit has been shifted in, the switch $SW_3$ is opened and the switch $SW_4$ is closed. Then, the 10 syndrome bits are shifted out of the register.

The syndromes that are obtained in this manner may comprise all $2^{10}=1024$ patterns of 10 binary bits. Each particular pattern is a function of only one combination of errors that can be present in the received 31-bit word and is independent of the underlying transmitted information. As a result, the syndrome patterns can be brought into one-to-one correspondence with error patterns in the class of correctable errors. In the presently disclosed example, the non-error condition, all 31 single bit error possibilities, all 465 double bit error patterns and 527 of the possible 4,459 triple bit error patterns have unique syndromes.

Thus, it is possible to generate a lookup table which describes the unique error pattern associated with each possible syndrome. Once a 31-bit word is received and its syndrome generated, the syndrome can be retrieved from the table to determine the corresponding error pattern. The logical value of the digits indicated by the error pattern stored in the table can then be changed to correct the transmission errors. Once this correction is carried out, the last 10 digits are removed from the corrected word, resulting in the original 21-bit block of information. This information can then be provided to the end utilization device 26.

From the foregoing it can be seen that the present invention provides an effective technique for encoding and decoding data in a manner that permits reliable transmission of the data through the medium of television signals. By encoding each block of data with an error checking code and interleaving the data among several different lines of the vertical blanking interval in successive fields of a television signal, the likelihood of loss of data due to impulse errors is substantially diminished. Furthermore, the rearrangement of the sequence of lines for transmission offers a level of security to prevent unauthorized access to the data.

It will be appreciated by those of ordinary skill in the art that the present invention can be embodied in other specific forms without departing from the spirit or essential characteristics thereof. For example, although described in the context of transmission via television signals, the encoding technique of the present invention is not limited to this form of transmission medium. Furthermore, the use of a (31,21) BCH code for forward error correction is illustrative of but one type of forward error correction code that can be employed.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for transmitting digital data in the medium of a standard television program signal, comprising the steps of:

assembling the data into multiple blocks each containing a predetermined number of bits of data related to a predetermined error correction code and encoding each block of data with said error correction code to produce encoded blocks of data;

inserting the encoded blocks of data into an array to thereby form multiple lines of information, each line comprising a bit from each of the encoded blocks of data;

adding a unique line identification codeword to each line of information;

inserting each line of information into a different respective horizontal line in the vertical blanking interval of a television signal; and transmitting the television signal with the lines of information inserted therein.

2. The method of claim 1 wherein the lines of information are inserted into a horizontal line of different respective fields in the television signal.

3. The method of claim 1 wherein the step of providing an error correction code comprises the generation of a preselected number of parity bits for each block of data and the addition of said parity bits to the block of data to form the encoded block.

4. The method of claim 3 wherein the preselected number of parity bits are generated by means of a cyclic binary coded hexadecimal code.

5. The method of claim 4 wherein said code comprises a (31,21) BCH code which produces an encoded block containing 21 bits of data and 10 parity bits.

6. The method of claim 1 wherein the information in said multiple blocks of data is transmitted over a number of lines of information that is equal to the number of bits in an encoded block of data 7. The method of claim 6 wherein each line of information contains only one bit from each encoded block of data.

8. The method of claim 1 wherein each line identification codeword is a multi-bit digital word produced in accordance with a non-linear code.

9. The method of claim 8 wherein each of said line identification codewords comprises n bits, and each codeword differs from every other codeword by at least n/3 bits.

10. A method for transmitting digital data, comprising the steps of:
assembling the data into blocks;
encoding each block of data with an error correction code;
storing the encoded blocks of data in respective columns of an array so that different bits in each encoded block occupy different respective rows in the array;
providing each row of bits in the array with a unique line identification code;
retrieving lines of data from the array, each line consisting of th bits in a respective row of the array and thereby comprising only one bit from each encoded block of data stored in the array plus a unique line identification code; and
separately transmitting each line of data.

11. The method of claim 10 wherein each line of data is transmitted in a horizontal line of a video signal.

12. The method of claim 11 wherein said horizontal line is in the vertical blanking interval of the video signal.

13. The method of claim 10 wherein the number of rows in the array is equal to the number of bits in an encoded block of data, so that each row comprises one bit of data from each encoded block stored in the array.

14. The method of claim 10 wherein said line identification codes comprise a non-linear code.

15. The method of claim 10 wherein the line identification codes represent successive numbering of the rows of the array, and further including the steps of generating a pseudo-random ordering of the rows in the array and sequentially transmitting said lines of data in said pseudo-random order.

16. The method of claim 10 wherein the encoding step comprises the steps of generating a predetermined number of parity bits for each block of data and adding said parity bits to the block of data.

17. The method of claim 16 wherein the parity bits are generated by means of a cyclic binary coded hexadecimal code.

18. Apparatus for transmitting digital data via standard television program signals, comprising:
means for assembling the data into blocks of predetermined length and encoding each block with an error correction code;
a memory for storing the encoded blocks of data in the form of an array such that each block is stored in a different column of the array;
means for adding a unique line identification code to each row of the array;
means for retrieving the stored data in he form of lines of information wherein each line comprises one bit from each block of data stored in the array plus a line identification code;
means for inserting each line of information into a respective horizontal line of a video signal; and
means for transmitting the video signal with the lines of information inserted therein.

19. The apparatus of claim 18 wherein said encoding means includes means for generating a preselected number of parity bits for each block of data and adding the parity bits to the block of data.

20. The apparatus of claim 19 wherein said encoding means comprises a BCH code generator.

21. The apparatus of claim 18 wherein said array has a number of rows equal to the number of bits in an encoded block of data, so that each row comprises one bit of data from each encoded block stored in the array.

22. The apparatus of claim 18 wherein said retrieving means includes a pseudo-random number generator and means for sequentially reading the rows of the array in an order determined by said number generator.

23. A system for communicating digital data via standard television program signals, comprising:
a transmitting portion which includes:
means for assembling the data into blocks of predetermined length and encoding each block with an error correction code,
a memory for storing the encoded blocks of data in the form of an array such that each block is stored in a different column of the array,
means for adding a unique line indemnification code t each row of the array;
means for retrieving the stored data in the form of lines of information wherein each line comprises at least one bit from each block of data stored in the array plus a line identification code,
means for inserting each line of information into a respective horizontal line of a video signal, and
means for transmitting the video signal with the lines of information inserted therein, and
a receiving portion which includes:
means for receiving the lines of information transmitted in a video signal and examining each received line for its line identification code;
a memory for storing received lines of information in an array such that each line occupies a predetermined row of the array indicated by its line identification code,
means for detecting and correcting bit errors based upon the received bits in a column of the array, and
means for retrieving corrected blocks of data from the respective columns of the array.

24. The system of claim 23 wherein said detecting and correcting means includes a syndrome computer.

25. The system of claim 23 wherein said detecting and correcting means inserts the proper bits in any line of information that is missing from the array.

26. A receiver for digital data which is transmitted within the horizontal lines of a television signal, comprising:
a memory for receiving the data transmitted within the lines of the television signal and storing the lines of data in the form of an array such that each line of data occupies a predetermined row of the array identified by the received data;
means for detecting and correcting bit errors based upon the received bits in a column of the array; and
means for retrieving corrected blocks of data from the respective columns of the array.

27. The receiver of column 26 wherein said detecting and correcting means includes a syndrome computer.

* * * * *